US012215998B2

(12) United States Patent
Pettersson et al.

(10) Patent No.: US 12,215,998 B2
(45) Date of Patent: Feb. 4, 2025

(54) METHOD AND SYSTEM FOR CONTROLLING A MINING AND/OR CONSTRUCTION MACHINE

(71) Applicant: EPIROC ROCK DRILLS AKTIEBOLAG, Orebro (SE)

(72) Inventors: Robert Pettersson, Kumla (SE); Erik Jakobsson, Vintrosa (SE)

(73) Assignee: EPIROC ROCK DRILLS AKTIEBOLAG, Örebro (SE)

( * ) Notice: Subject to any disclaimer, the term of this patent is extended or adjusted under 35 U.S.C. 154(b) by 353 days.

(21) Appl. No.: 17/596,001

(22) PCT Filed: Jun. 3, 2020

(86) PCT No.: PCT/SE2020/050560
§ 371 (c)(1),
(2) Date: Dec. 1, 2021

(87) PCT Pub. No.: WO2020/246933
PCT Pub. Date: Dec. 10, 2020

(65) Prior Publication Data
US 2022/0236100 A1    Jul. 28, 2022

(30) Foreign Application Priority Data
Jun. 4, 2019   (SE) .................... 1950660-9

(51) Int. Cl.
*G01G 19/00*    (2006.01)
*E21F 13/00*    (2006.01)
(Continued)

(52) U.S. Cl.
CPC .......... *G01G 19/08* (2013.01); *E21F 13/025* (2013.01); *G01L 1/22* (2013.01); *G07C 5/0808* (2013.01)

(58) Field of Classification Search
CPC ......... G01G 19/08; E21F 13/025; G01L 1/22; G07C 5/0808
(Continued)

(56) References Cited

U.S. PATENT DOCUMENTS 5,531,122 A * 7/1996 Chatham .................. G07C 3/00
73/806
7,194,384 B2   3/2007 Olsson
(Continued)

FOREIGN PATENT DOCUMENTS

AU     2018200481 A1   2/2018
EP     0162608 A1     11/1985
(Continued)

OTHER PUBLICATIONS

International Search Report and Written Opinion in corresponding International Application No. PCT/SE2020/050560 mailed Sep. 8, 2020 (9 pages).
(Continued)

*Primary Examiner* — Mahmoud S Ismail
(74) *Attorney, Agent, or Firm* — Sage Patent Group

(57) ABSTRACT

A method for estimating a level of stress that a mine truck is subjected to. The mine truck includes a frame; a container for carrying payload supported by the frame; and at least one sensor, the at least one sensor delivering signals being dependent on a force acting on the mine truck. The method includes for at least a first position of the frame, estimating a level of stress that said at least a first position is subjected to in response to a force acting on the mine truck, wherein said at least a first position is a position being different from the position of said at least one sensor; and estimating said level of stress utilising a model representation of the level of stress for said at least a first position wherein said model
(Continued)

representation output said estimated level of stress utilising sensor signals from said at least one sensor as input signals.

17 Claims, 5 Drawing Sheets

(51) Int. Cl.
*E21F 13/02* (2006.01)
*G01G 19/08* (2006.01)
*G01L 1/22* (2006.01)
*G07C 5/08* (2006.01)

(58) Field of Classification Search
USPC .......................................................... 701/32.9
See application file for complete search history.

(56) References Cited

U.S. PATENT DOCUMENTS

| | | | |
|---|---|---|---|
| 7,283,932 B2 | 10/2007 | Olsson | |
| 7,433,802 B2 | 10/2008 | Olsson | |
| 2004/0104596 A1* | 6/2004 | Bender | G01G 19/12 296/183.2 |
| 2007/0145824 A1 | 6/2007 | Olsson | |
| 2009/0187527 A1* | 7/2009 | Mcaree | G01G 19/08 702/174 |
| 2018/0058046 A1 | 3/2018 | Chitty et al. | |

FOREIGN PATENT DOCUMENTS

| | | |
|---|---|---|
| EP | 2637010 B1 | 6/2015 |
| GB | 2558252 A | 7/2018 |
| KR | 101017407 B1 | 2/2011 |
| WO | 2006116758 A2 | 11/2006 |
| WO | 2012023690 A1 | 2/2012 |
| WO | 2017017533 A1 | 2/2017 |

OTHER PUBLICATIONS

Jordan McBain et al.; "Software Architecture for Condition Monitoring of Mobile Underground Mining Machinery"; A framework Extensible to Intelligent Signal Processing and Analysis; 2012 IEEE (Institute of Electrical and Electronics Engineers) Conference on Prognostics and Health Management; Date of Conference: Jun. 18-21, 2012; DOI: 10.1109/ICPHM.2012.6299543; 12 pages.

* cited by examiner

METHOD AND SYSTEM FOR CONTROLLING A MINING AND/OR CONSTRUCTION MACHINE

CROSS-REFERENCE TO RELATED APPLICATIONS

This application is a U.S. National Stage application of PCT/SE2020/050560, filed Jun. 3, 2020 and published on Dec. 10, 2020 as WO 2020/246933, which claims the benefit of Swedish Patent Application No. 1950660-9 filed Jun. 4, 2019, all of which are hereby incorporated by reference in their entireties.

FIELD OF THE INVENTION

The present invention relates in particular to mining and tunnelling, and more specifically to a method and system for controlling estimating wear of a mining and/or construction machine. The invention also relates to a mining and/or construction machine, as well as a control system that implements the method according to the invention.

BACKGROUND OF THE INVENTION

Rock excavation, in particular underground rock excavation, but also e.g. surface mining and construction, may be carried out using various techniques, where excavation using drilling and blasting technology is a commonly used method. The excavation may comprise creation of e.g. a rock cavity having a predefined shape and geographical location. This may be the case, for example, when creating tunnels or other kinds of underground cavities. Excavation using drilling and blasting is, in general, carried out in a manner in which drilling is performed in rounds, where a round of holes is drilled to thereafter be loaded with explosives to blast the rock.

The broken rock is then removed, and following removal of rock being detached by the blasting, a new round of holes are drilled to blast a subsequent portion of the cavity to be created. This is oftentimes repeated a number of times until excavation of the desired cavity has been completed.

The excavation may generate large volumes of broken rock to be transported away, and e.g. mine trucks may be utilised to facilitate such rock removal. These mine trucks may be of substantial dimensions. For example, with regard to underground mine trucks, these may be designed to carry loads e.g. in the order of 10-100 metric tonnes of load. Surface mine trucks may be designed to carry even higher loads, such as hundreds of tonnes of load. These trucks in general comprise a frame, which is exposed to substantial levels of stress e.g. during loading and unloading operations, and also during hauling of payload.

These mine trucks are hence subjected not only to the oftentimes harsh conditions that may prevail in mines, but also to substantial levels of mechanical stress e.g. during loading and unloading of payload.

The life and condition of e.g. a mine truck frame is related to the manner in which the machine is used. Damage from stress accumulates over time, and e.g. the frame may finally break when the accumulated levels of stress exceeds the levels for fatigue failure that the frame/material is capable of withstanding.

Similar machines may, however, be subjected to largely differing levels of stress e.g. depending on the environment in which they operate, and/or the manner in which they are being manoeuvred.

SUMMARY OF THE INVENTION

It would hence be advantageous to achieve a method and system that may improve predictability regarding e.g. the expected lifespan and/or status of a mine truck as time progress while the truck is in operation.

According to the present invention, it is provided a method for estimating a level of stress that a mine truck is subjected to, the mine truck comprising:
 a frame;
 a container for carrying payload supported by the frame; and
 at least one sensor, the at least one sensor delivering signals being dependent on a force acting on the mine truck;
the method comprises:
 for at least a first position of the frame, estimating a level of stress that said at least a first position is subjected to in response to a force acting on the mine truck, wherein said at least a first position is a position being different from the position of said at least one sensor; and
 estimating said level of stress utilising a model representation of the level of stress for said at least a first position of the frame, wherein said model representation output said estimated level of stress utilising sensor signals from said at least one sensor as input signals.

As was discussed above, machines such as mine trucks may be subjected harsh conditions during operation, and may also frequently be subjected to high levels of stress that impact the overall life span of the mine truck. Mine trucks are, in general, of a body-on-frame design, and the service life and general condition of a mine truck frame is related to the manner in which the machine is used in every day service.

Mine trucks may be used to remove and transport broken rock/ore from, for example, a location where blasting has been performed to another location for further processing. Such machines are oftentimes heavy and of large dimensions, and the machines may operate in environments in which distances to surrounding obstacles may be small, where there also constantly may be an imminent risk for collisions.

There may exist a desire to obtain knowledge of the manner in which a mine truck is worn over time. This may be performed by inducing all imaginable types of faults in controlled tests. This approach can be costly and time consuming, and also give rise to potentially dangerous situations, e.g. in the case of heavy machines. There are also no guarantees that the investigated faults are faults that will actually occur. Such methods may work well for frequently occurring faults, while for certain types of components, such as the frame structure of a mine truck, it is both hard to detect actual damage through sensor signals, and time consuming to actually reach a state where the frame is worn out by induced testing.

Another method is to let a machine run in normal operation, and both collect sensor data and record any faults. This, however, suffers from drawbacks, in particular when the target is to generate a predictive maintenance model for a newly developed machine. The collection of enough data for creating a failure model will inevitably take a long time, require many units (machines), and still the method will likely never see many faults that actually occur. The generated data sets will likely be imbalanced due to the low number of faults that actually have occurred, and therefore be difficult to draw any actual conclusions from.

With regard to, for example, slowly developing errors, such as cracks in truck frames, poses a specifically complicated case for collecting data since it takes too long to generate any failure data at all. The machine may already be outdated and preceded by the next model before enough data for proper analysis has actually been collected.

Stress may be measured through the use of strain gauges, being positioned on various positions on the truck frame, but strain gauges are expensive and easily damaged. In order to obtain knowledge of the damage of the truck as time progress, measurements throughout the life of the machine are also required to be able to monitor the current condition of the mine truck. This, in turn, results in high demands regarding the durability of sensors, especially in harsh mining applications where sensors easily may be damaged, and use of strain gauges would not provide a feasible solution.

The present invention relates to a method where, instead of detecting actual faults, the time history of the use of the machine is utilised to estimate how much of the machine operational life that has been consumed, where this may be performed by comparing accumulated levels of stress with known material data. In this way, known theory on material behaviour can be combined with on-line monitoring on a machine.

The rate of life consumption of a machine is dependent on the manner in which the machine is used, and on the external loads that the machine is subjected to. Strain gauges may be used in fatigue analysis to measure stress in a structure, and accumulated damage be calculated. However, with regard to e.g. the mining industry, the introduction of a large number of strain gauges on each machine would give rise to increased complexity and high maintenance costs, with the probable risk that sensors are not replaced in case they break, and such sensor malfunction may also go by undetected, since the sensors do not otherwise affect the operation of the machine According to embodiments of the present invention, a method is provided which, instead of equipping machines with a plurality of high cost sensors specifically for determining stress throughout the service life of the machines, utilises different types of sensors that are already available on-board the machines, where these sensors are used to estimate a level of stress.

According to the invention, when estimating a level of stress for at least a first position of the frame, sensor signals of at least one on-board sensor located at a position being different from the position for which the estimation is being made is utilised. The at least one sensor, e.g. plurality of sensors, may further be sensors that are used in regular use of the machine, and for other purposes than estimating a level of stress. The level of stress for said at least one first position may hence be determined without utilising a strain gauge at said at least one first position when the model has been generated.

Furthermore, the level of stress that the at least a first position of the frame is subjected to is estimated utilising a model representation of the level of stress for said at least a first position of the frame, where the model representation utilises sensor signals from said at least one sensor to output an estimate of a level of stress at said first position.

In this way, by utilising a model representation of the stress that the truck frame is subjected to, the need for use of a strain gauge, once the model has been generated, can be omitted in everyday use, and instead signals from standard on-board sensors, i.e. sensors already being used in the general operation of the mine truck are utilised to determine the level of stress that the mine truck is subjected to. The model representation hence represents a relationship between standard on-board sensors and temporary strain gauge sensors on the mine truck.

Once a model has been generated for a mine truck, this model may then be utilised for similar machines, and hence monitoring of accumulation of stress may be implemented on an entire fleet of mine trucks by amending software without the need for adding further sensors.

In general, a mine truck contains numerous sensors intended to supply the on-board control system with information. According to embodiments of the invention, such sensors are utilised to estimate damage on the mine truck frame for prognostic purposes, even though they were not at all designed or intended for such a task.

According to embodiments of the invention, said at least one sensor comprises at least one load cell (load sensor) for sensing a payload being carried by the container of the mine truck. It has been realised that such sensors may contain a high degree of information regarding the stress that a particular position on the truck frame is subjected to, even though the load cell is not located at the position for which stress is determined.

The at least one load cell for estimating load may further constitute a load cell configured to sense a load by being subjected to a deformation, and the deformation is caused by the container, and/or container motions.

The load cell may comprise a transducer that is used to create e.g. an electrical signal having a magnitude that is directly proportional to the force being measured.

In particular, the at least one load cell is preferably arranged between the frame and the container, and thereby in positions where the container moves in relation to the frame. This has the advantage that e.g. oscillations or other mutual motions that take place between the container and the frame will be sensed. Such oscillations may not, or may only in part, transplant e.g. to pneumatic or hydraulic cylinders, such as struts, arranged between a frame and wheel shafts, and where such oscillations may not transplant to the wheels of the mine truck. The arrangement of at least one load cell between the frame and the container may thereby sense stress that may not be able to sense by measurements being carried out e.g. using struts between the frame and the wheels.

According to embodiments of the invention, a plurality of load cells, e.g. two or three or more of the kind being subjected to deformation caused by the container, and/or container motions, are arranged between the frame and the container. For example, load cells may be arranged at a front location of the container, and/or at left and/or right pivot points of the container, where the pivot points are the points about which the container when dumping the load.

According to embodiments of the invention, a level of stress for said at least a first position is continuously estimated as time progress, and estimated levels of stress may be accumulated over time for said at least a first position to obtain a measure of wear, also denoted damage in the present patent application, of the mine truck.

According to embodiments of the invention a level of stress is accumulated over time for a plurality of positions of the frame of the mine truck to obtain a measure of wear for each of said plurality of positions.

The model representation of the level of stress for said at least a first position may be a model representation generated by:
    recording sensor signals from a strain gauge located at said at least one position, simultaneously recording sensor signals from said at least one sensor, where the model representation may be a data driven model representation, where the parameters of the model may be generated from the recorded data. In this way, the sensor signals from the strain gauge are used as the target that the output from the model should generate from the input signals, i.e. the signals from the at least one sensor being different from the strain gauge.

Although the model may be generated using sensor signals from one sensor, sensor signals from a plurality of sensors of the mine truck may be used to determine the parameters of the model, where the plurality of sensors are sensors located at positions being different from said at least one first position.

Hence the level of stress may be estimated using the sensor signals from the plurality of sensors as input signals to the model representation, which thereby output the estimate on the basis of the signals form the plurality of sensors.

With regard to the plurality of sensors, as mentioned, one or more of the sensors may be load sensors. According to embodiments of the invention, one or more of the sensors may also be one or more inclination sensors determining an inclination in a lateral and/or longitudinal direction of the mine truck.

In general, sensors being relied upon in regular operation of the machine may be utilised. Such sensors will be replaced/repaired in case of a fault. Thereby required sensor signals to perform estimation according to the invention will also always be available. For example, load cells are utilised e.g. for production target follow up, and inclination sensors are utilised to guarantee stability. Pressure sensors may be utilised to control hydraulic systems.

Furthermore, a plurality of consecutive signals from said at least one sensor, i.e. a plurality of signals for consecutive moments in time, such as a plurality of signals within 1 second, or within 0.1-1 second, may be used as input signals to the model representation. The model representation may be generated using such frequent signals, and also utilise such frequent signals to generate the output estimation.

The at least one sensor may be a sensor designed to deliver sensor signals at a frequency of at least 10 times a second, or at a higher frequency than 10 times a second, such as 20-50 times a second or more, and the sensor signals may be arranged to be sampled by a sampling frequency of e.g. any sampling frequency in the interval 10 Hz-1000 Hz, or any other suitable sampling frequency.

According to embodiments of the invention, different model representations are used for different positions of the frame of the mine truck. Hence, a model representation can be generated for each position for which stress is to be estimated. Also, different models may be utilised for different states of operation of the mine truck. The forces that act on a mine truck in operation may vary substantially in dependence of the state of operation of the mine truck, and accuracy in the estimations may be increased by the use of different models for different states of operation.

The different states of operation of the mine truck may include two or more from: loading, unloading, hauling, idle, driving empty, any combination of two or more states occurring simultaneously. Forces that the mine truck is subjected to may e.g. comprise various loads that the mine truck is subjected to, such as when loading and unloading, and also forces acting on the mine truck as the mine truck is in motion. Furthermore, the forces that the mine truck is subjected to may give rise e.g. to torsion which will give rise to wear. The forces acting on the mine truck may also give rise e.g. to forces induced by the structure of the mine truck, where these induced forces may have a higher impact on locations other than where the initial force act. This may be due to, for example, the force giving rise to torques and/or oscillations in the structure of the mine truck. The forces acting on the mine truck may hence be both external and internal forces, and the at least one sensor delivering signals being dependent on a force acting on the mine truck may deliver sensor signals being dependent on the force directly and/or loads being induced by the force.

The method according to the invention may comprise to determine when the state of operation changes from one state to another, so that an appropriate model may be utilised in the estimations.

According to embodiments of the invention, the model representation is a linear, or substantially linear, model representation of stress exhibited at said at least one position of the mine truck frame. Such models may provide a solution that provide a high accuracy in the estimations while simultaneously providing a solution that is lightweight from a computational point of view.

According to embodiments of the invention, the accumulation of stress levels of the mine truck may also be utilised to predict future status of the mine truck. The model representations being utilised according to embodiments of the invention enable real time calculations of the stress history for a plurality of positions, and also wear/damage accumulation calculations in real time for the plurality of positions. This may be utilised in various ways.

For example, it may be estimated a point in time in which the mine truck is expected to suffer a fault, or be in need for service, based on the current accumulated level of stress and the time that has lapsed since accumulation of stress commenced, which e.g. may be years back. For example, it may be assumed that the accumulated wear may continue to increase at a same rate, at least when operating conditions otherwise remain the same.

Furthermore, the accumulations of stress may be utilised to evaluate mine truck usage, where e.g. the manner in which an operator operates the machine may be evaluated, and where e.g. excessively harmful operator behaviour and/or excessively harmful manoeuvring of the mine truck may be identified so that proper actions may be taken.

Data regarding different mine trucks, and also mine trucks from different work sites, may be compared.

As was mentioned, the sensor signals may be sampled at any suitable sampling frequency. In some cases, the stress may be represented by high frequency signals, and in case the sensor signals are down sampled to an extent where such data may be partially lost, there may also be an underestimation of the actual level of stress. In such cases the estimated stress, or an accumulated level of stress, for down sampled stress signals may be compared to accumulated damage for high frequency signals. In this way suitable compensation may be determined if found required, where the compensation may then be utilised in the estimations.

The compensation may be performed e.g. by increasing the sampling frequency, and/or compensating measurement results e.g. by a factor for positions where damage is driven by higher frequency components, where hence this e.g. may be determined empirically.

According to embodiments of the invention, the invention is implemented in a mine truck comprising a front wheel axle for carrying front axle wheels, and a rear wheel axle for carrying rear axle wheels, wherein at least the rear axle is an unsuspended wheel axle.

It will be appreciated that the embodiments described in relation to the method aspect of the present invention are all applicable also for the system aspect of the present invention. That is, the system may be configured to perform the method as defined in any of the above described embodiments. Further, the method may be a computer implemented method which e.g. may be implemented in one or more control units of control system.

Further characteristics of the present invention and advantages thereof are indicated in the detailed description of exemplary embodiments set out below and the attached drawings.

DETAILED DESCRIPTION OF EXEMPLARY EMBODIMENTS

Embodiments of the present invention will be exemplified in the following in view of a particular example of a mine truck. The invention is, however, applicable for all kinds of mine trucks being designed to carry and transport payload such as broken rock in a mining and/or tunnelling environment. For example, the invention is applicable for mine trucks comprising other types of containers than the illustrated dump box, such as e.g. front end loaders etc.

Figure 1:
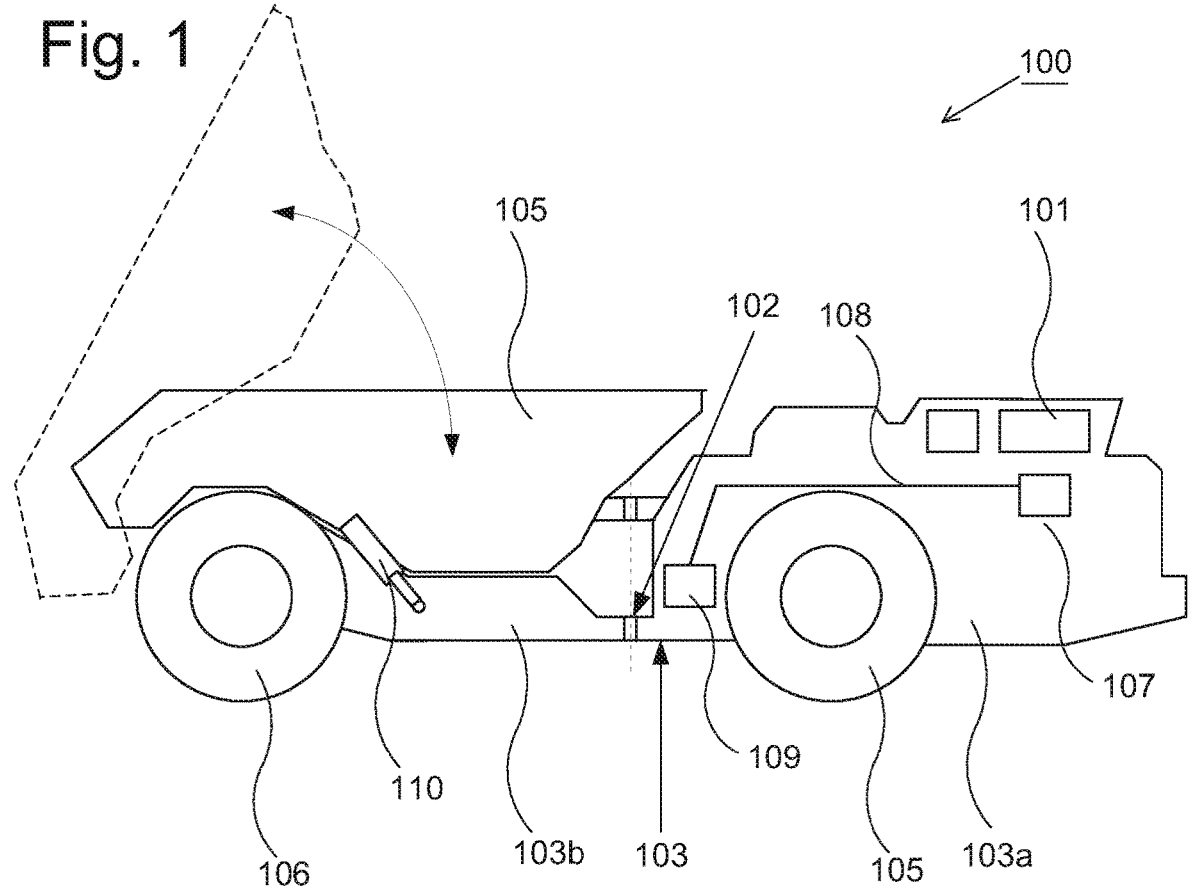
FIG. 1 illustrates an exemplary mine truck for which stress may be accumulated according to embodiments of the invention.

FIG. 1 illustrates a side view of an exemplary mine truck 100 which may comprise a system according to the present invention. According to the present example, the mine truck 100 is designed for underground use, such as in underground mines and tunnels. The mine truck 100 further constitutes an articulated machine, where a front portion is connected to a rear portion by means of a hinge 102 (also being disclosed in FIG. 2), and the mine truck 100 is consequently steered by means of articulated steering to facilitate manoeuvring. Mine trucks of the disclosed kind are often driven in surroundings where the distance to surrounding rock walls may be small, and articulated machines may provide advantages in manoeuvrability over non-articulated machines in such environments. As is appreciated by the person skilled in the art, the illustrated mine truck merely forms an example of usability of the invention, and, in principle, the invention is applicable for essentially any kind of mine truck.

The mine truck 100 is of a body-on-frame design, and comprises a frame 103, which comprises a front frame portion 103a and a rear frame portion 103b. The frame 103 carrying the truck body parts.

Furthermore, the mine truck 100 is utilised to load and transport away materials, such as e.g. excavated rock through the use of a container 105 for carrying the payload, the container 105 commonly, and in the following, being denoted dump box. The mine truck 100 also comprises front axle wheels 105 and rear axle wheels 106 (only right-hand side wheels being disclosed) to allow the truck 100 to be driven between different locations of the mine/tunnel. The truck also comprises an operator cabin 101 for truck operation by an onboard operator. The operator cabin 101 may comprise various operator controllable means, such as e.g. one or more joysticks, and/or one or more displays for use in the operator control of the mine truck 100. There may also exist various additional means for allowing the operator to request various actions to be taken by the mine truck, such as e.g. buttons, keyboards, switches etc. The operator cabin may also comprise further and/or other types of operator controllable means.

The mine truck 100 further comprises a machine control system comprising at least one control unit 107. The control unit 107 is configured to control various of the functions of the truck 100, where the control unit 107 may receive control signals from the operator through the operator controllable means requesting various actions to be taken, and where the control signals, such as operator inflicted joystick deflections and/or manoeuvring of other means may be translated by the control system to suitable control commands. The control unit 107 may, for example, be configured to request motions to be carried out by various actuators such as cylinders/motors/pumps etc., e.g. for manoeuvring the mine truck e.g. in terms of setting the truck in motion, and/or controlling the joint 102 to steer the machine. The control unit 107 may also be utilised e.g. to control various equipment of the mine truck 100 on the basis of signals from operator controllable means. For example, joysticks may be utilised e.g. in unloading operations to manoeuvre the dump box 105, e.g. by manoeuvring one or more hydraulic cylinders 110.

Trucks of the disclosed kind may comprise more than one control unit, e.g. a plurality of control units, where each control unit, respectively, may be arranged to be responsible for monitoring and carrying out different functions of the truck 100. For reasons of simplicity, however, it will be assumed in the following that the various functions are controlled by the control unit 107.

Control systems of the disclosed kind may further comprise a data bus 108, which may e.g. be a CAN bus, or any other suitable kind of data bus, and which may be used to allow communication between various units of the machine 100, and which may utilise e.g. CANopen safety protocol or any other suitable protocol in the communication.

The mine truck 100 further comprises a plurality of sensors, partly discussed further below, and such sensors may be connected to one or more I/O units 109 providing an interface towards the control system on the mine truck, where sensor data may be made available on a data bus by the I/O units 109, and thereby readable by the control unit 107 for use according to the invention.

Trucks of the disclosed kind may be configured to be controlled by an operator being present in the operator cabin 101, but trucks of the disclosed kind may also configured to be remote-controlled, and/or be autonomously controlled.

As was mentioned above, mine trucks may be of very large dimensions and exhibit substantial mass, in particular when carrying payload, where the mine truck may be designed to carry e.g. up to 50-100 tonnes of broken rock or more. Thereby the truck is subjected to substantial levels of stress during operation, where in particular loading and unloading operations may subject the mine truck to elevated levels of stress.

As was also mentioned above, according to embodiments of the invention, it is an object to provide a method for estimating a level of stress that a position of the mine truck frame 103 is subjected to. According to embodiments of the invention, the level of stress that a position of the mine truck frame 103 is subjected to may be continuously determined so that thereby the accumulated levels of stress, and hence the wear/damage, that the mine truck has been subjected to as time progress may also be determined, e.g. in order to be able to determine that the truck, or components thereof, is reaching end of life or is in need for service prior to a failure actually arises, so that parts may be replaced prior to failure, or the truck be taken out of service.

An exemplary method 300 according to the invention will be described with reference to FIG. 3. The method starts in step 301, in which it is determined whether a level of stress is to be estimated. According to embodiments of the invention, this may be arranged to always be carried out when the mine truck is in operation. Alternatively, the method may be triggered to be carried out, for example, when one or more sensors or other means indicate that the mine truck is about to be set in motion or about to be loaded or unloaded. It may be preferable to perform the estimation continuously, e.g. to allow accumulation over time. The estimation/accumulation may also be configured to be paused e.g. in situations when the mine truck is in a stationary state without a loading and/or unloading operation being carried out.

According to embodiments of the invention, as will be discussed below, the transition from step 301 to step 302 may be triggered to occur when a change in mode of operation of the mine truck is detected, which e.g. may be utilised in case different stress level models are utilised for different modes of operation.

Hence, when it is determined that the level of stress that the mine truck is subjected to is to be determined according to embodiments of the invention, the method continues to step 302. As was mentioned, the invention may, for example, be arranged to be carried out by a control unit of the control system of the mine truck, such as the control unit 107 of FIG. 1. The control unit 107 may be configured to receive sensor signals from one or more signals arranged on the mine truck in step 302.

Further, according to embodiments of the invention, sensor signals from sensors being susceptible to forces acting on the mine truck are utilised and received. Since the sensor signals are susceptible to forces acting on the mine truck, the delivered sensor signals, in particular changes in delivered sensor signals, will reflect changes in forces including loads acting on the mine truck, and the sensors are also located at positions being different form the position for which stress is determined. Furthermore, sensor signals may be received from a plurality of sensors being arranged at different locations of the mine truck. The sensors may also constitute different kinds of sensors, i.e. the sensors may be utilised to sense different physical quantities. The sensors are also being different from strain gauges.

In order to be able to detect transient levels of stress that the mine truck is subjected to, the sensor signals may be signals from sensors that delivers signals e.g. a plurality of times per second. For example, the sensors may be arranged to deliver signals at frequencies in the interval 10 Hz-50 Hz or more, and in step 302 the sensor signals may be sampled at e.g. 50 Hz, 100 Hz or any other suitable sampling frequency, and a plurality of samples from each sensor may be utilised in the estimation of stress. The sensor signals may further be sensor signals from sensors that are used in regular usage of the machine, and thereby primarily for other purposes than estimating a level of stress.

Figure 2:
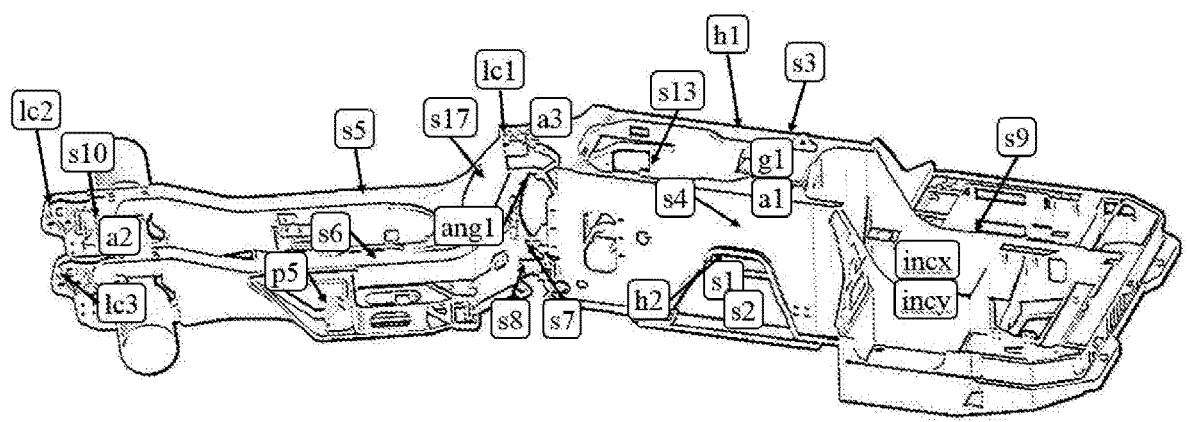
FIG. 2 illustrates an exemplary frame of the mine truck of FIG. 1.

The sensors being utilised according to embodiments of the invention may include one or more from various different types of sensors. FIG. 2 schematically illustrates the mine truck frame 103 for the mine truck 100 of FIG. 1. In FIG. 2 various positions of the mine truck frame 103 for which stress levels may be estimated are indicated by s1, s2, . . . sn. According to embodiments of the invention, a level of stress may be estimated for one such position sx, where the position sx may be any arbitrary position on the mine truck frame of said positions s1, s2, . . . sn. Furthermore, a level of stress may be estimated for any number of such positions sx on the mine truck frame, and where estimated levels of stress may be accumulated over time.

FIG. 2 also schematically illustrates various sensors at different positions on the mine truck frame 103, where one or more of these sensors may be utilized in the estimation of a level of stress for a position sx.

Such sensors may, according to the present example, constitute the following:

Load sensor at a front location of the dump a bucket, (lc1);
Load sensors at left (lc2) and right pivot points (lc2), respectively, where the points are the points about which the dump bucket pivots (indicated by dashed lines in FIG. 1) when dumping the load;
Inclination sensors for determining the inclination in machine pitch direction, (incx) and machine roll direction, (incy). Such sensors may alternatively or in addition comprise e.g. a 3-axis accelerometer (a1) and/or 3-axis gyroscope (g1);
there may also be one or more shock absorbers, where sensor signals may indicate current length of such shock absorbers, such as length of left shock absorber, (h1) and length of right shock absorber, (h2).
Steering angle sensor, (ang1), delivering signals representing the current steering angle, i.e. according to the present example the angle of the joint 102 and hence the angle of the front body portion in relation to the rear body portion.

The sensor signals may also comprise e.g. a wheel steering pressure (not shown) which may be hydraulically connected to the dump cylinders 110 while dumping takes place, and hence represent dump cylinder pressure. Dump cylinder pressure may alternatively be determined e.g. by one or more other sensors.

Also, e.g. the speed at which the mine truck is traveling may be utilised.

Sensor signals from one or more of these, or further, sensors may hence be utilized.

Returning to FIG. 3, the method then continues to step 303, where a counter i is set to zero. The counter i represents the number of positions sx of the truck frame for which stress is to be estimated. According to embodiments of the invention, stress is estimated for a number of positions of the truck frame, where such positions e.g. may be selected to be positions that are considered to be, or determined to be, subjected to the highest levels of stress during normal operation, or otherwise be determined to be positions where a failure may occur. The estimation of levels of stress may be arranged to be performed for any suitable number of positions of the mine truck frame.

The method then continues to step 304, where a current level of stress that position i is subjected to is estimated by calculation through the use of the sensor signals received from the sensors in step 302. In addition to the use of sensor signals when calculating the current level of stress, a model representation for the position i of levels of stress is utilized, and where the level of stress that this position is subjected to is calculated through the model representation using the detected sensor signals as input signals to the model, which then output the estimation of the level of stress for position i.

The obtained level of stress is then added to a previously accumulated total stress that position i has been subjected to, step 305. The counter i is increased by one in step 306. This is then repeated until it is determined in step 307 that a level of stress has been estimated and accumulated for each position i. In step 308 it is determined whether estimation is to be continued, and as was mentioned this may be the case e.g. for as long as the mine truck is in operation. Otherwise the method may be ended in step 309.

Figure 4:
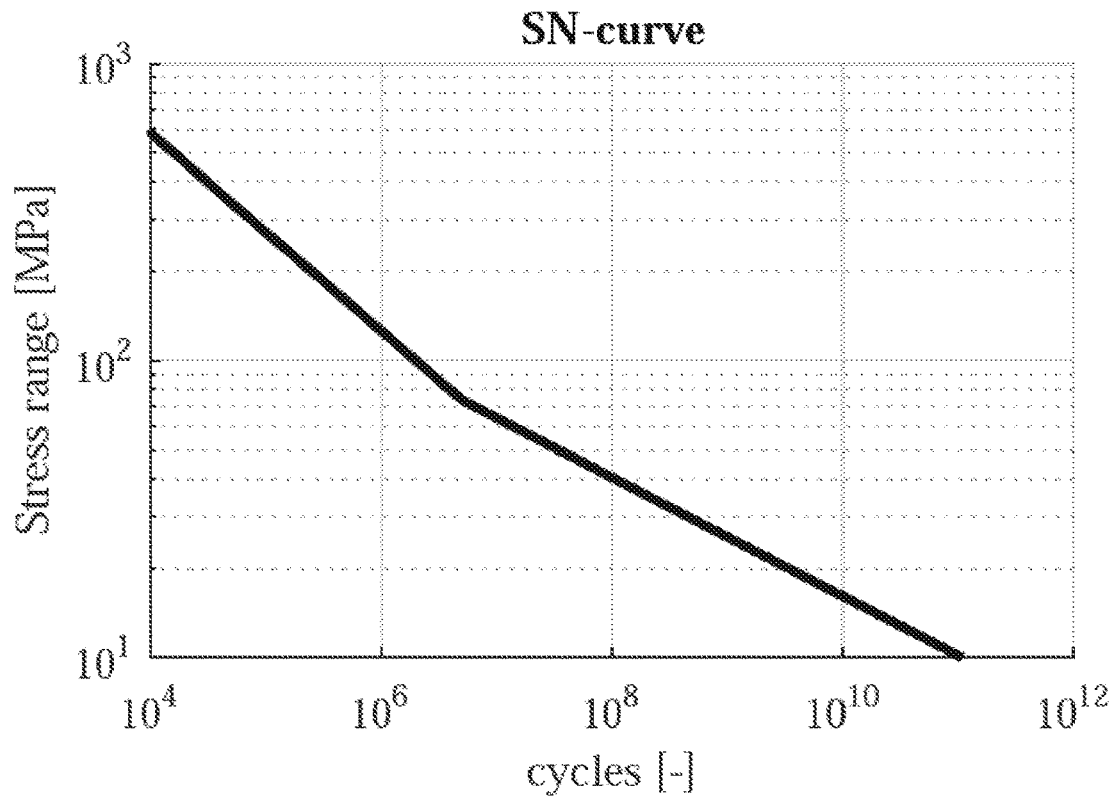
FIG. 4 illustrates an example of a stress cycle diagram.

With regard to stress, a typical metallic material can withstand a certain number of load/stress cycles with a given stress amplitude before failure. The number of cycles is dependent on the cycle amplitude, and the relation is often illustrated by a stress to number of cycles diagram (SN-diagram). Such diagrams are well known, and an exemplary SN diagram is shown in FIG. 4. In particular, FIG. 4 shows the relationship between stress level and the number of cycles until fatigue failure occurs for a given probability. The structure can withstand a number of cycles as given by the curve for a given stress range level.

The mine truck will, however, be subjected to largely differing stress levels containing variable amplitude loading, which makes direct use of a graph of the kind in FIG. 4 difficult.

According to embodiments of the invention, this is accounted for. For example, a rain flow counting method may be utilised. Rain flow counting may be utilised to define load cycles of varying amplitude from a stress time-signal. The cycles may be sorted in "bins" according to stress amplitude, and e.g. a Palmgren-Miner rule may be utilised to evaluate and sum up the accumulated damage for each bin. This is exemplified by eq. 1:

$$D = \sum_{i=1}^{k} \frac{n_i}{N_i} \qquad \text{eq. 1}$$

Figure 5:
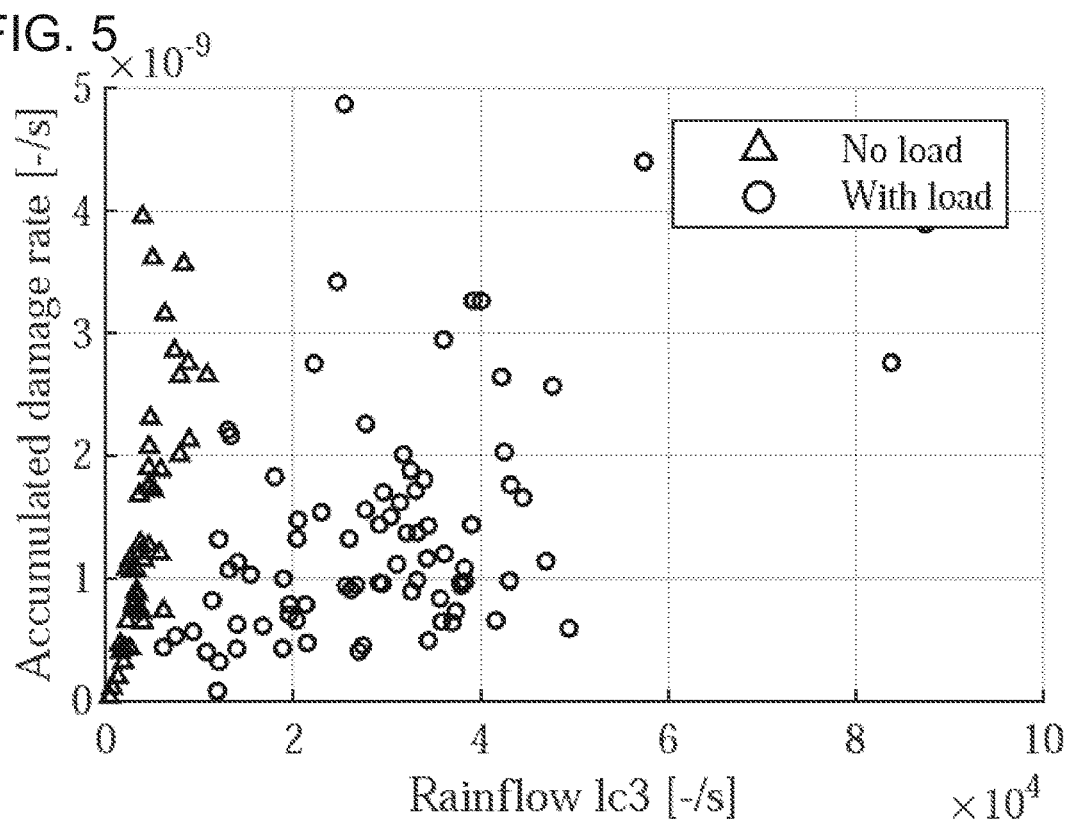
FIG. 5 illustrates an example of a relationship between damage rate and load cycle frequency.

In eq. 1, $n_i$ is the number of cycles at a particular stress amplitude indexed by i from the rain flow count, and $N_i$ is the number of constant amplitude cycles until fatigue failure at the same stress range given by the SN-diagram. D is the accumulated damage, and when the sum reaches "1" the rule states that a failure may be likely to occur according to the probability in the SN-diagram being used. An exemplary illustration of a rain flow count is illustrated in FIG. 5 for the load cell lc3 discussed above, and for a mine truck, where the rain flow count is illustrated both for a loaded state and an unloaded state. According to the invention, the similar method may be utilised, however, where the rain flow count is performed for estimations obtained from the model representation, where still e.g. the Palmgren-Miner rule, or any other suitable method, may be utilised to accumulate a total wear/damage that the various stress cycles have given rise to.

With regard to the actual estimation of a level of stress, according to embodiments of the invention, this is, as mentioned, performed by a method which utilises a model based on signals from on-board sensors that in general are primarily utilised for other use. In order to minimize the complexity of the model and measurement system, it may be desirable to use sensor signals from as few sensors as possible. The model may be a data driven model that has been determined by correlating sensor signals to actual levels of stress that a particular position sx has been subjected to. This may be performed by attaching a strain gauge to position sx, while logging data from both the strain gauge and the sensors for which it has been determined that the sensor signals are to participate in the generation of the model representation.

Figure 3:
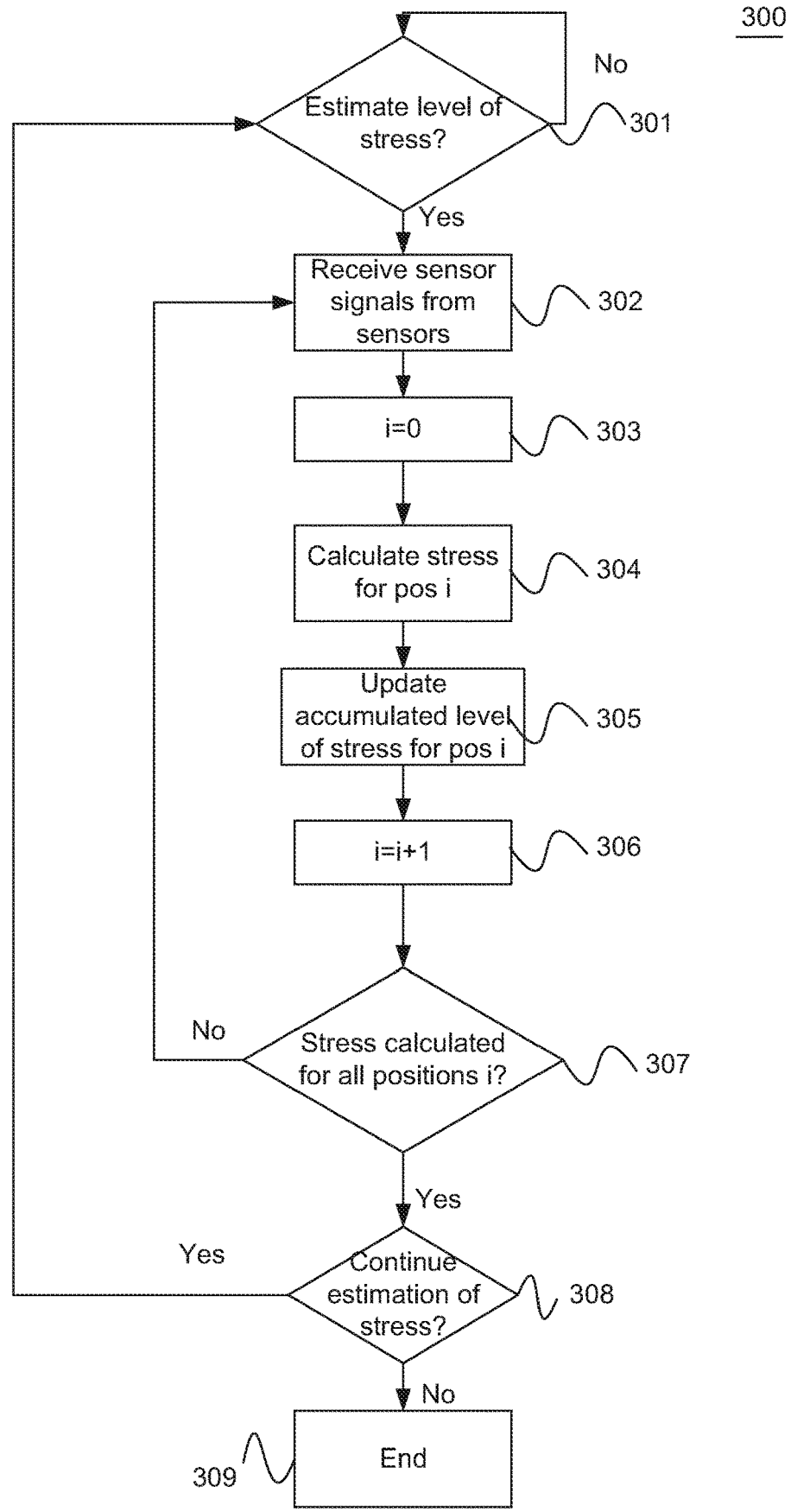
FIG. 3 illustrates an exemplary method according to the invention.

Although according to embodiments of the invention, various sensors may always be utilised, it may be desirable to reduce the number of machine sensors that participate in the generation of the model representation, and hence also that are used in the subsequent estimations of stress levels and accumulations thereof according to FIG. 3. In principle the number of sensors being used may be kept to a minimum e.g. for computational complexity reasons, and also in order to reduce the number of possible sources of error. However, in general the more sensors being used, the higher the accuracy, at least for as long as the sensors providing the highest coherence are still utilised. Preferably sensors are utilised that to the highest extent contains information used to describe a given output signal. Sensor signals of sensors having little or no impact on the levels of stress exhibited by a position of the truck frame may preferably be discarded to reduce computational complexity.

For example, the mine truck may comprise a relatively large number of sensors that provides sensor signals e.g. on a control system data bus, for which reason it may be desirable to determine which sensors provide the highest coherence with measured stress signals. Such determinations may be made before the model representation is generated, e.g. empirically, so that it can be determined which input signals that provide the most information that correlate with the output signals.

When determining which signals from which sensors that are to participate in the model generation, a coherence determination may be performed to give an indication of which input signals that can be used to estimate an output signal with a linear model for a particular location on the truck frame.

In general the coherence will be high, or relatively high for a plurality of sensors, and such sensors may then be selected for use when generating a data driven model representing the stress that a particular location is subjected to.

This determination may be performed, for example, through the use of an ordinary coherence function. Coherence functions are well described in the art, and describes how much of a systems output signal that can be explained using a linear relationship from the input signal for each frequency covered in the measurement. A low coherence indicates either a lack of relation between input and output, or that the relation is highly non-linear or contaminated by noise. The coherence between strain gauge signals of a strain gauge at position sx and sensor signals from other sensors may then be correlated to determine which sensors that should or should not form part of the model generation, e.g. because the correlation is found to be sufficiently high to, or too low to, significantly contribute to the model in a positive sense.

According to embodiments of the invention, it has been realised that the sensor signals from one or more of the load cells provides a particularly good choice of the standard sensors for use e.g. in a linear model representation. According to embodiments of the invention, therefore, at least one of the sensors being utilised in the generation of the model and in the subsequent estimation of levels of stress is a load cell. The load cells are favourable e.g. because they are positioned in positions where e.g. a dump box moves in relation to the frame, thereby to a large extent sensing mutual motions between frame and dump box.

A load cell may comprise a transducer that is used to create e.g. an electrical signal having a magnitude that is directly proportional to the force being measured. There exist various kinds of load cells as is known per se, and the load cells may be utilised to sense the load of the dump bucket, where more than one load cell may be utilised in this regard.

In general, sensors that exhibit low coherence indicate that such sensors need not form part of the model development since such sensor signals contain only little or no information describing the stress exhibited at a particular location.

Model representations may be performed for various different positions of the mine truck frame, and different sensors may be utilised for different positions on the frame.

With regard to the model representation of levels of stress for one or more positions of the mine truck frame, these one or more model representations are determined beforehand and stored in the system.

According to embodiments of the invention, a single strain gauge is utilised when generating the model representation, but since a model representation may be performed for a plurality of positions of the truck frame, a plurality of strain gauges may be attached to the truck frame, i.e. at each of the positions for which a model is to be generated while measurement is ongoing, and in order to be able to determine models representing levels of stress in relation to sensor signals from other sensors for a plurality of positions of the mine truck frame. Model representations may hence be performed in parallel for a plurality of positions on the frame, where signals from the strain gauges are recorded together with the sensor signals.

In general, strain gauges are highly likely to be subjected to faults. They will oftentimes have to be positioned in exposed locations with little or no cover, and may e.g. form accidental targets for e.g. stray rock or other objects. When generating the model, data may be collected by sampling the sensor signals being delivered from the strain gauges, as well as reading sensor signals from the further sensors of the truck, where these sensor signals may be read from the data bus, e.g. at some suitable sampling rate. The collected data from data bus and strain gauges may subsequently be resampled to a same sampling rate, and be correlated in time to generate a homogeneous data set suitable for system identification and other forms of machine learning.

In case signals from the strain gauges are read separately from the data bus signals, which may oftentimes be the case, signals from a further sensor may be read together with the strain gauge signals, so that the two different data sets may be correlated to each other to thereby take into account time shifts of the different recordings.

Once the data required to generate the models has been collected, the strain gauges may be removed, since the models will take the place of the strain gauge. In this way, use of strain gauges, which are both expensive and easy to damage, is replaced by use of the generated models in the long time use of the mine truck Various different types of models may be utilised according to embodiments of the present invention to describe the levels of stress that a particular location of the truck frame is subjected to.

According to embodiments of the invention, the stress levels are modelled by linear models, or substantially linear, models. This facilitates e.g. use of the coherence function to provide information regarding which input signals contain information on the output signals. The result may differ for different positions of the truck frame.

According to the present example, models using multiple input signals, to generate a single output signal are utilised, and according to embodiments of the invention, the single input single output ARX (AutoRegressive model with eXogenous inputs) model is utilised and may be expressed as:

$$y_t + a_1 y_{t-1} + \ldots + a_{n_a} y_{t-n_a} = b_1 u_{t-n_k} + \ldots + b_{n_b} u_{t-n_k-n_b+1} + e_t \quad (2)$$

where $y_t$ is the output at time t and $u_t$ is the input at time t.

The parameters $a_1, \ldots, a_{n_a}, b_1, \ldots b_{n_b}$ are adjusted to create the best fit of the model, and $n_k$ is an optional time delay. The term $e_t$ represents the noise.

In matrix notation, expanded to multiple inputs, the expression can be written as a linear regression:

$$y(t) = \varphi_t^T \theta + e_t \quad (3)$$

where $$\begin{cases} \varphi(t) = \left( -y_{t-1}, \ldots, -y_{t-n_a}, u_t^1, \ldots, u_{t-n_b}^1, u_t^{n_b}, \ldots, u_{t-n_b}^{n_b} \right)^T \\ \theta = \left( a_1, \ldots, a_{n_a}, b_1^1, \ldots, b_{n_b}^1, b_1^{n_u}, \ldots, b_{n_b}^{n_u} \right) \end{cases} \quad (4)$$

The multiple input signals are notated with superscripts from 1 to $n_u$ where $n_u$ is the number of input signals. The same notation is used for the corresponding set of parameters $b^1, \ldots, b^{n_u}$.

The parameter vector $\theta$ in (4) may, for example, be estimated using a least squares approach. This minimizes the residual between the measured and estimated stress signals, and since the least squares problem is convex, a global optimum is found.

The above represents one non-limiting example of generating a model representation of the stress that a particular position sx is subjected to, where the stress level is represented by y(t) in the equations. As is appreciated, various other suitable models, such as, for example, more advanced linear models, may be utilised. However, with regard to the present example, practical tests revealed that when compared to more advanced linear models, the more advanced linear models did not provide any major advantages, and that less advanced models, such as the ARX model structure provide a good compromise of accuracy and complexity.

According to the present example, tests disclosed that a model according to equation (3) with na=8, nb=16 and nk=0 exhibited a good compromise of accuracy and computational complexity. However, various other different parameters may alternatively be utilised.

It is also contemplated that non-linear models may be utilised. Use of a linear model, however, provide advantages of reduced complexity and high computational efficiency while maintaining a high accuracy in the estimations.

Depending on the type of external forces that the mine truck is subjected to, the applied force, and thereby stress the mine truck is subjected to may be more or less instantaneous. This means that changes may occur at high frequencies, and the ability to detect such stress may be subject to the sampling frequency at which signals are collected. The total level of stress that a particular situation gives rise to may therefore not be detected to the full extent in case a lower sampling frequency is utilised.

In general, down sampling may be desired to utilise e.g. to reduce the amounts of data being collected. In order to ensure that such down sampling of the signals do not cause major loss of information, accumulated damage for down sampled stress signals may be compared to accumulated damage for the high frequency signals, and suitable compensation may be performed if found required.

The compensation may be performed e.g. by increasing the sampling frequency, and/or compensating measurement results e.g. by a factor for positions where damage is driven by higher frequency components, where this e.g. may be determined empirically.

When measuring e.g. sensor signals on the communication system data bus and strain gauge sensor signals separately, accurate synchronization of the signals from the different measurement systems may be of importance to obtain a model representation exhibiting a desired accuracy of the damage that the machine is subjected to, and it may be advantageous to ensure that synchronisation of the measurement results is maintained also when the measurements span longer periods of time, which may oftentimes be the case.

According to embodiments of the invention, a single model representation is generated and used to represent all various situations, states of operation that the mine truck may encounter. Use of a single model to represent a full driving cycle may also provide the least complicated approach, e.g. when using a linear model. In particular, there would be no need to keep track on what the current status of operation of the machine is, or determining when to switch between different models.

It may, however, not always be possible to use a single model, such as a linear model, to represent all possible states of operation in a sufficiently accurate manner. Such models may have as result that the stress that the mine truck in reality is subjected to may be overestimated or underestimated for one or more common situations in the operation of the machine.

According to embodiments of the invention, different models may be generated and utilised for different states of operation in order to increase the accuracy in the estimations.

The mine truck according to the present example is a heavy-duty machine designed for usage in underground mining that may be rated for substantial loads, according to the present non-limiting example 60+ tonnes of payload. A typical usage cycle of the mine truck may comprise the states of operation:

Loading, where a wheel loader drops rock material into the dump box of the truck. A plurality of scoops may be required to fill the dump box, where each scoop may comprise over 20 metric tons of material being dropped into the dump box.

Hauling, where the truck moves the material from a loading position to an unloading position. A common scenario is driving up a steep incline, possibly for hours, until the machine reaches the surface of the mine. The roads being travelled may vary from paved roads to very rough gravel roads.

Unloading, when the truck lifts the dump box and the load falls off.

Driving empty, when the truck drives back to be loaded once more.

There may also be other situations that may contribute with a non-negligible amount to the accumulated damage of the machine.

For example, such situations may comprise compaction of the load using e.g. a large wheel loader or accidentally hitting the rock wall while driving. This type of events may be unknown, but may still be reflected in the data sets available.

The origin of the stress that the mine truck is subjected to may differ substantially from one state of operation to another. For example, during hauling, or when driving empty, the machine may be largely linear in the behaviour, at least for as long as the load does not move around considerably. The main source of stress excitation in this case is road profile, where forces act on the machine entering the machine through the wheels.

When unloading the machine, on the other hand, the load paths change considerably. For example, forces acting on the front load cell is shifted over to the dump cylinders 110. As the load is lifted, load also falls off, generating even more changes to the previous mechanical system that prevailed during hauling, and which had constant mass. Hence, in comparison to hauling, the driving force changes from wheel input, to oscillations from load cylinder end stops, and falling rocks.

The data may hence be divided into different states of operation according to the above in view of changes of this kind, and in general different segments may relate to different configurations of the machine, where preferably machine behaviour is as close to linear as possible within the same state of operation, at least when a linear model representation is utilised.

According to embodiments of the invention, different models are therefore generated and used for each state of operation, or for different groups of states of operation. The models may still be generated in the same manner, where the recorded data may be divided afterwards according to state of operation in the generation of the model. When generating the model representation, relatively large amounts of data may be recorded, where this may be performed continuously a plurality of times for each of the exemplary states of operation. The resulting amount of data is then utilised to identify correlations between the recorded data from the various sensor signals of on-board sensors, and sensors signals of the one or more strain gauges being attached to the one or more positions for which a model representation is to be generated.

In this case, the method according to FIG. 3 may in addition to selecting the proper model for the position for which stress is estimated, also comprise a selection of model based on the state of operation. In order to utilise different models for different situations, it must also be possible to identify changes in states of the mine truck.

For example, with regard to the present example, break points for different segments may be identified using various criteria, such as e.g. based on two or more conditions. For example, if the machine speed passes a threshold of 0.1 km/h, either accelerating or coming to a stop, a new segment may be created. Furthermore, in case a sensor for checking if the dump box is closed changes state, a new segment may also be created. Similarly, changes in weight may be utilised to determine ongoing loading/unloading.

In addition to e.g. determining if the machine speed passes a threshold, it may be determined which of a number of conditions that are true between each break point.

These may include the following non-limiting states of operation which it may be desirable to be able to differentiate between:

Idle: Average speed <0.1 km/h and no mass change.

Hauling: Average speed >0.1 km/h and mass in box >10 tonne.

Unloading: Box open sensor active or a mass decrease >3 tonne to next segment.

Loading: Mass increase >3 tonne during the segment.

Driving empty: Average speed >0.1 km/h and mass in box <10 tonne.

Mixed: Average speed >0.1 km/h and significant mass change, i.e., driving while loading or unloading.

When generating different models for different driving situations/states of operation, again, coherence analysis may be performed to determine which sensors that are to be utilised in the generation of the model for the particular segment, and also for the particular position of the mine truck frame. For example, driving empty and hauling may depend on largely or fully the same sensors, while, the loading task may be dependent on primarily on the load cells located close to the box being filled with material, whereas the unloading task may exhibit a high coherence for the hydraulic cylinder 110 pressure during unloading.

In addition to the above states of operation, different models may, according to embodiments of the invention, be generated also for different levels of load, e.g. to increase accuracy for further levels of load in case a single model may not provide a desired accuracy for all levels of load. For example, the load may be divided into two or more intervals, where a model may be generated for each interval.

According to the above, the levels of stress, and thereby damage, that a mine truck frame is subjected to may hence be determined without use of strain gauges other than when generating the model representations, where these models then may be utilised in all mine trucks being similar to the one using which the models have generated. This hence provides for a solution that is easy to implement, and where on-board sensors that are already present for other use are utilised. This also has the advantage that if a sensor being used in the estimation of levels of stress malfunctions, the sensor will most likely be rapidly replaced, since other, more critical applications in general will depend on the sensor working properly.

According to embodiments of the invention, the accumulation of wear of the mine truck may also be utilised to predict future status of the mine truck. Such prognostics may be utilised to improve reliability of the mine truck. The model representations being utilised according to embodiments of the invention enable real time calculations of the stress history for a large number of positions, and also wear/damage accumulation calculations in real time for the plurality of positions. This may be utilised in a number of ways.

According to prior solutions, a current level of wear may be estimated by assuming that all machines are used equally, and simply let damage be a function of engine hours only. Based on experience from other machines, an average damage per time unit may then be used to evaluate the current condition. Such methods, however, do not take into account differences in regard of the manner in which the machine is used. No individualization of the machines can be done. Method of this prior solution kind may be refined by utilising drive cycle segmentation, where current accumulated damage may be on how much time the machine spends doing different tasks. For example, unloading in general generates more damage on some positions of the frame than driving without load. Such methods still allow a lot of room for error with regard to how roughly the machine is actually used.

According to embodiments of the present invention, with access to stress measurements on various locations on the machine, a new paradigm of individualized monitoring is possible. Knowing the stress history enables a system where calculated accumulated wear/damage is available in real-time.

Figure 6:
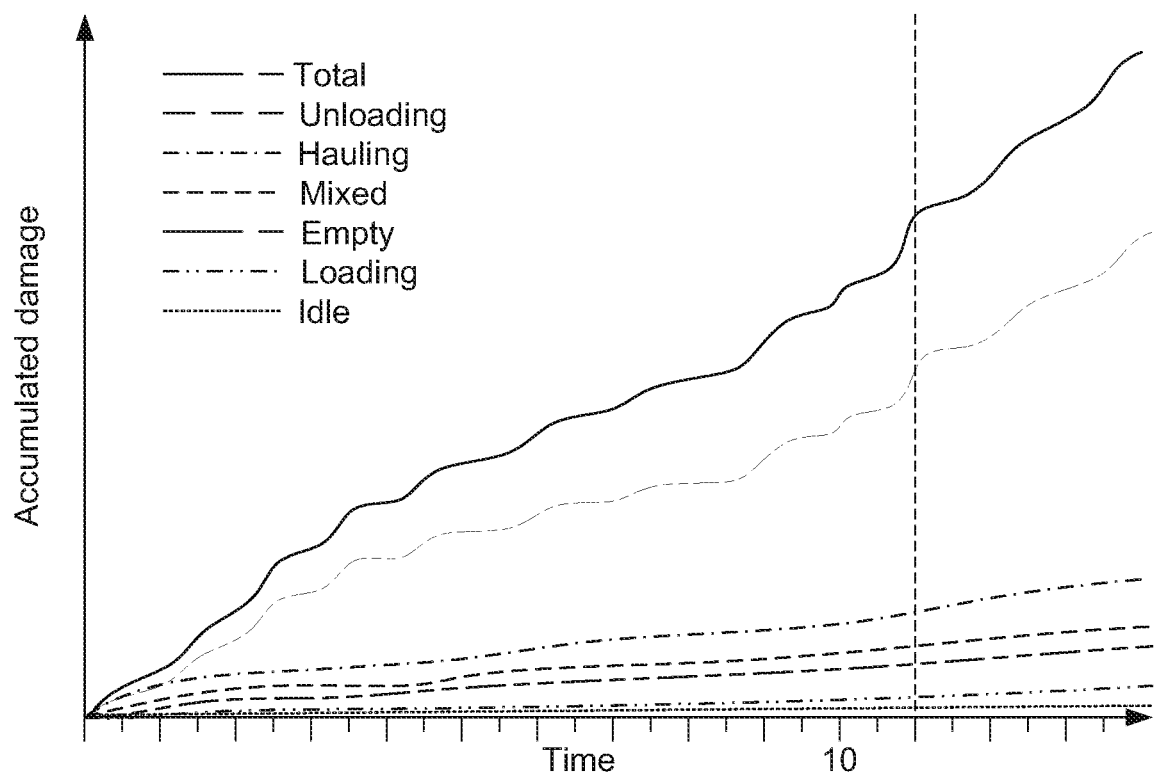
FIG. 6 illustrates accumulated estimations over time for different states of operation.

FIG. 6 illustrates a concrete real-life example of individualized monitoring utilising measurements according to the invention. FIG. 6 illustrates accumulated wear at an exemplary position sx of the mine truck frame. Furthermore, the wear is illustrated for each different state of operation, i.e. idle, hauling, loading, unloading, mixed, empty. Also, the total accumulated wear (damage) is disclosed. The actual wear of a particular position of the mine truck frame may differ substantially from one position to another, and the figure is hence only exemplary. For example, according to the illustrated example, position sx is relatively insensitive to the loading operation, whereas other positions may be substantially more sensitive e.g. to the loading operation. The illustrated example may in principle span any suitable time interval, but according to the present example the figure represents about 14 days of real-life estimations.

The figure also illustrates a further feature according to embodiments of the invention. For example, it can be noted that there may be large differences in damage accumulation for different segments of time, which may e.g. represent work shifts.

As can be seen from the present example, most of the total damage originates from the unloading segment. It can further be deduced that the slope of the damage accumulation seems to alternate between a high and low value. That is, the damage accumulates at different rates for different time segments, where the time segments can be interpreted as the machine is being used differently in different work shifts. This is perhaps particularly apparent around day 10-11.

This is a result of different operators using very different techniques to unload the payload. One of the techniques is more aggressive, where all functions are run at maximum. The second technique is gentler, where the box is lifted more slowly, and where the lifting speed is reduced before hitting the end stop. Such difference in usage has a large impact on the life of the machine, and by measuring the accumulated damage such differences can be identified according to the invention, and also be acted upon to thereby reduce future damage.

The accumulated damage may further be analysed in terms of damage being generated during different segments. It is possible to learn how a particular individual machine is used, and how damage is likely to evolve over time. In addition to determining influence from operator behaviour, further factors may also be identified. For example, the impact of road conditions and size of material being transported on wear of the machine may be identified by the estimations of levels of stress.

For as long as the current damage level is known, and the usage of the machine is not expected to change, a prediction of future damage may therefore be made according to the invention with much better accuracy than using e.g. a time average.

This prediction, in turn, may be used to schedule maintenance intervals, and in the long run also the economic life of the entire machine. By continuously knowing the accumulated damage of a particular machine, the task of predicting future damage can be individualized both to a specific machine, but also down to a specific shift or cycle. This enables improvements both for manually operated machines, but also in the case when mining machinery operates autonomously.

A further important application for monitoring the damage continuously is when machines become increasingly autonomous. With an operator on-board, usage is oftentimes manually adjusted to local conditions. For example, the speed may be reduced when road conditions are poor. For an autonomous truck, it may not be obvious how to choose speed with respect to both production on the one hand and life of the equipment on the other hand. According to embodiments of the invention, such determinations may be substantially facilitated.

In sum, according to the invention, it has been realised that available on-board sensors can be used to estimate damage on a mine truck frame by utilising models, such as linear models, or other models, such as non-linear models.

The invention has been exemplified principally for a manually operated mine truck above. According to embodiments of the invention, the mine truck 100 is, instead, designed to be remote controlled from a remote location. The invention is equally applicable for such machines. Furthermore, according to embodiments of the invention, the machine is an autonomously operating machine. The invention may also be utilized in any kind of movable mine truck being utilised to transport payload from one location to another. The invention is also applicable for underground machines as well machines operating above ground.

The invention claimed is:

1. A method for estimating a level of stress that a mine truck is subjected to, the mine truck comprising:
   a frame;
   a container for carrying payload supported by the frame; and
   at least one sensor, the at least one sensor delivering signals being dependent on a force acting on the mine truck, the method comprising:
      for at least a first position of the frame, estimating a level of stress that said at least a first position is subjected to in response to a force acting on the mine truck, wherein said at least a first position is a position being different from the position of said at least one sensor;
      estimating said level of stress utilising a model representation of the level of stress for said at least a first position, wherein said model representation output said estimated level of stress utilising sensor signals from said at least one sensor as input signals, and
      utilising different model representations for different positions of the frame of the mine truck, different states of operation of the mine truck, and different levels of load.

2. The method according to claim 1, wherein said at least one sensor comprises at least one load cell for sensing a payload being carried by the container.

3. The method according to claim 2, wherein the at least one load cell for estimating load is a load cell configured to sense a load by being subjected to a deformation.

4. The method according to claim 3, wherein the deformation is caused by the container.

5. The method according to claim 2, wherein the at least one load cell is arranged between the frame and the container.

6. The method according to claim 5, wherein a plurality of load cells are arranged between the frame and the container.

7. The method according to claim 5, wherein the at least one load cell is arranged at a front location of the container, and/or at left and/or right pivot points of the container, where the pivot points are the points about which the container when dumping the load.

8. The method according to claim 1, further comprising:
   continuously estimating a level of stress for said at least a first position, and
   accumulating over time estimated levels of stress for said at least a first position to obtain a measure of wear of said mine truck.

9. The method according to claim 1, further comprising:
   accumulating over time estimated levels of stress for a plurality of positions of the frame of the mine truck to obtain a measure of wear for each of said plurality of positions.

10. The method according to claim 1, wherein:
    said model representation of the level of stress for said at least a first position is a model representation generated by:
       recording sensor signals from a strain gauge located at said at least one position,
       simultaneously recording sensor signals from said at least one sensor, and
       the model representation being a data driven model representation, parameters of the model being generated from the recorded data.

11. The method according to claim 1, further comprising:
    estimating the level of stress for said at least one first position utilising sensor signals from a plurality of sensors of the mine truck, the plurality of sensors being sensors located at a position being different from said at least one first position, wherein said model representation output said estimated level of stress utilising sensor signals from said plurality of sensors as input signals.

12. The method according to claim 11, wherein at least one of said plurality of sensors is an inclination sensor determining an inclination in a lateral and/or longitudinal direction of the mine truck.

13. The method according to claim 1, further comprising:
    when said model representation output said estimated level of stress utilising sensor signals from said at least one sensor as input signals, the model representation utilise sensor signals from a plurality of consecutive signals from said at least one sensor as input signals.

14. The method according to claim 1, wherein the model representation is a linear model representation of stress exhibited at said at least one position of the mine truck frame.

15. The method according to claim 1, further comprising causing the machine to be customized based on the generated models.

16. A computer program comprising instructions which, when the program is executed by a computer, cause the computer to:
    estimate, for at least a first position of the frame, a level of stress that said at least a first position is subjected to in response to a force acting on the mine truck, wherein said at least a first position is a position being different from the position of said at least one sensor;
    estimate said level of stress utilising a model representation of the level of stress for said at least a first position, wherein said model representation output said estimated level of stress utilising sensor signals from said at least one sensor as input signals, and
    utilise different model representations for different positions of the frame of the mine truck, different states of operation of the mine truck, and different levels of load.

17. A system for estimating a level of stress that a mine truck is subjected to, the system being designed to estimate a level of stress of a mine truck comprising:
    a frame;
    a container for carrying payload supported by the frame; and at least one sensor, the at least one sensor delivering signals being dependent on a force acting on the mine truck;

the system comprising:
- means for, for at least a first position of the frame, estimating a level of stress that said at least a first position is subjected to in response to a force acting on the mine truck, wherein said at least a first position is a position being different from the position of said at least one sensor;
- means for estimating said level of stress utilising a model representation of the level of stress for said at least a first position, wherein said model representation output said estimated level of stress utilising sensor signals from said at least one sensor as input signals; and
- means for utilising different model representations for different positions of the frame of the mine truck, different states of operation of the mine truck, and different levels of load.

* * * * *